United States Patent
Maehara

(10) Patent No.: US 6,653,364 B2
(45) Date of Patent: Nov. 25, 2003

(54) DECOMPOSABLE RESIN COMPOSITION AND METHOD FOR PRODUCING THE SAME

(75) Inventor: Hiroshi Maehara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 09/987,790

(22) Filed: Nov. 16, 2001

(65) Prior Publication Data

US 2002/0091172 A1 Jul. 11, 2002

(30) Foreign Application Priority Data

Nov. 20, 2000 (JP) ........................ 2000-353417

(51) Int. Cl.[7] .................................................. C08J 3/00
(52) U.S. Cl. ......................................................... 523/1
(58) Field of Search ............................. 522/31, 87, 88, 522/150, 162; 523/124, 125, 126, 128

(56) References Cited

U.S. PATENT DOCUMENTS

| | | | | |
|---|---|---|---|---|
| 3,852,227 A | * | 12/1974 | Matsuda et al. | 523/125 |
| 4,056,665 A | * | 11/1977 | Taylor et al. | 204/157.15 |
| 4,101,323 A | * | 7/1978 | Buhr et al. | 430/170 |
| 4,360,606 A | * | 11/1982 | Tobias et al. | 523/124 |
| 4,476,255 A | * | 10/1984 | Bailey et al. | 523/125 |
| 4,931,488 A | * | 6/1990 | Chiquet | 523/126 |
| 4,939,194 A | * | 7/1990 | Scott et al. | 524/134 |
| 4,983,645 A | * | 1/1991 | Schwab | 522/47 |
| 5,055,357 A | * | 10/1991 | Plotkin et al. | 428/413 |
| 5,274,019 A | * | 12/1993 | Poyner et al. | 524/358 |
| 5,308,906 A | * | 5/1994 | Taylor et al. | 524/398 |
| 5,342,862 A | * | 8/1994 | Reich | 523/125 |
| 5,385,955 A | * | 1/1995 | Tarshiani et al. | 522/31 |
| 5,457,144 A | * | 10/1995 | Holy et al. | 524/108 |
| 5,470,526 A | * | 11/1995 | Wilfong et al. | 428/36.6 |
| 5,545,681 A | * | 8/1996 | Honkonen | 524/115 |
| 5,744,516 A | * | 4/1998 | Hashitani et al. | 523/124 |
| 5,753,724 A | * | 5/1998 | Edgington et al. | 523/124 |
| 5,795,923 A | * | 8/1998 | Shahid | 523/125 |
| 5,854,304 A | * | 12/1998 | Garcia et al. | 523/124 |
| 5,973,024 A | * | 10/1999 | Imashiro et al. | 523/124 |
| 5,993,796 A | * | 11/1999 | Fedorov et al. | 424/78.17 |
| 6,225,019 B1 | | 5/2001 | Matsuda et al. | 430/270 |
| 6,482,872 B2 | * | 11/2002 | Downie | 523/124 |

FOREIGN PATENT DOCUMENTS

| | | |
|---|---|---|
| EP | 0 778 495 A1 | 6/1997 |
| JP | 10-171120 | 6/1998 |
| WO | WO 95/17216 | 6/1995 |

* cited by examiner

Primary Examiner—James J. Seidleck
Assistant Examiner—Sanza L McClendon
(74) Attorney, Agent, or Firm—Fitzpatrick, Cella, Harper & Scinto

(57) ABSTRACT

The invention provides a decomposable resin composition, which is stable at the time of use and which quickly decomposes when discarded. According to the present invention, there is provided a resin composition comprising an agent generating an acid or a base upon response to light or heat together with a hydrolyzable and biodegradable resin. The decomposable resin composition can promote decomposition of the polymer by generating an acid or a base in the resin by carrying out light irradiation and/or a heat treatment at a desired time and can control the decomposition speed of the polymer by controlling the generation amount of an acid or a base.

1 Claim, No Drawings

DECOMPOSABLE RESIN COMPOSITION AND METHOD FOR PRODUCING THE SAME

BACKGROUND OF THE INVENTION

1. Field of the Invention

The present invention relates to a hydrolyzable and biodegradable resin composition in consideration of the global environment and more particularly relates to a decomposable resin composition that has a low impact on the environmental and a method of treating the resin composition for lowering the environmental impact.

2. Related Background Art

In the past, humans successively produced useful domestic and industrial materials by employing coal chemical technologies and then petrochemical technologies. In particular, polymer materials may be symbolic examples. There have been produced useful resins including plastic materials such as polyethylene, polypropylene and polyvinyl chloride and rubbers such as polyisoprene and polybutadiene. Further, recently, resin materials having particularly excellent characteristics have been developed, including polyimide resins, which have heat and impact resistance, and full-aromatic liquid crystal polymers.

However, these resins are not biodegradable and remain unchanged in the environment for long after being discarded, imposing a significant, negative burden on the global environment. The waste from industries and domestic life has become a serious social problem. Today, there is an increased expectation for materials and products to be environmentally friendly. At the same time, it is preferable that these products and materials be manufactured with a minimal possible reliance on natural resources.

For such a purpose, biodegradable polymers that are easily decomposed in the environment have been developed. A substantial object is to obtain a resin that satisfies contradicting properties such as stability during use and quick decomposition when discarded. Further, based on the purpose, the decomposition speed itself is required to be controlled.

Consequently, the purpose of the present invention is to provide a decomposable resin composition, which is stable at the time of use, quickly decomposed when discarded and whose decomposition speed can be controlled.

SUMMARY OF THE INVENTION

The inventor of the present invention conducted an extensive investigation in order to solve the problem and found that the above purpose can be achieved by mixing a compound capable of generating an acid or a base by light irradiation or heating at a desired time with a decomposable resin and then generating an acid or a base in the decomposable resin by carrying out light irradiation and/or heat treatment at the desired time so as to promote the decomposition of the resin and thus achieved the invention.

The present invention includes a resin composition comprising, in a hydrolyzable and biodegradable resin, an agent generating an acid upon exposure to light and/or an agent generating a base upon exposure to light.

Further, the present invention provides a resin composition comprising, in a hydrolyzable and biodegradable resin, an agent generating an acid upon exposure to heat and/or an agent generating a base upon exposure to heat.

Further, the present invention provides a resin composition comprising, in a hydrolyzable and biodegradable resin, an agent generating an acid upon exposure to light and/or an agent generating a base upon exposure to light together with an agent generating an acid upon exposure to heating and/or an agent generating a base by heating.

Further, the present invention provides a method of producing a resin composition comprising the steps of: providing a resin composition comprising, in a hydrolyzable and biodegradable resin, an agent generating an acid upon exposure to light and/or an agent generating a base upon exposure to light; subjecting the resin composition to light irradiation and/or heat treatment to decompose the resin composition to monomers; polymerizing the monomers to produce a decomposable resin; and mixing compounds generating an acid or a base by light irradiation or heating with the decomposable resin.

Further, the present invention provides a method of treating a resin composition comprising the steps of: providing the resin composition comprising, in a hydrolyzable and biodegradable resin, an agent generating an acid upon exposure to light and/or an agent generating a base upon exposure to light; and subjecting the resin composition to light irradiation.

Further, the present invention provides a method of treating a resin composition comprising the steps of: providing the resin composition comprising, in a hydrolyzable and biodegradable resin, an agent generating an acid upon exposure to light and/or an agent generating a base upon exposure to light; subjecting the resin composition to light irradiation; and thereafter carrying out a heat treatment.

Further, the present invention provides a method of treating a resin composition comprising the steps of: providing the resin composition comprising, in a hydrolyzable and biodegradable resin, an agent generating an acid upon exposure to heat and/or an agent generating a base upon exposure to heat; and subjecting the resin composition to a heat treatment.

Further, the present invention provides a method of treating a resin composition comprising the steps of: providing the resin composition comprising, in a hydrolyzable and biodegradable resin, an agent generating an acid upon exposure to light and/or an agent generating a base upon exposure to light together with an agent generating an acid upon exposure to heat and/or an agent generating a base upon exposure to heat; and subjecting the resin composition to light irradiation and a heat treatment.

DESCRIPTION OF THE PREFERRED EMBODIMENTS

As the decomposable resin to be employed in the present invention, usable are a wide range of well-known biodegradable, hydrolyzable polyesters. Especially preferable are polylactic acid, polylactic acid-aliphatic polyester copolymers and copolymers of saccharides and dicarboxylic acids having a structure defined as the following formula:

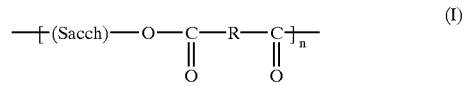

$$-[(Sacch)-O-\underset{\underset{O}{\|}}{C}-R-\underset{\underset{O}{\|}}{C}]_n-  \quad (I)$$

(Where (Sacch) denotes the saccharide structure and R denotes an alkylene group or a divalent aromatic ring.).

Monosaccharides are usable for the saccharide structure portion in the formula, including neutral saccharides such as D-glycelaldehyde, D-dihydroxyacetone, D-xylose, D-glucose, D-fructose, D-mannose, D-galactose and L-fucose; acidic saccharides such as D-glucuronic acid and L-iduronic acid; aminosaccharides such as D-glucosamine, D-galactosamine, N-acetylglucosamine, N-acetylgalactosamine and N-acetylmuramic acid; dialuric acid such as N-acetylneuraminic acid; glycitols such as glycerol and inositol; and disaccharides such as saccharose, maltose, lactose, cellobiose and trehalose. Further polysaccharides are usable such as amylose, cellulose, chitin, chitosan, hyaluronic acid, chondoroitin hexasulfuric acid, keratosulfuric acid and heparine.

On the other hand, R in the formula may preferably be an alkylene of 1 to 12 carbons or a divalent aromatic group, for example, phenylene or naphthylene. Examples of a dicarboxylic acid containing such groups are aliphatic dicarboxylic acids, such as malonic acid, succinic acid, glutaric acid, adipic acid, pimelic acid, suberic acid, azelaic acid, sebacic acid, 1,9-nonanedicarboxylic acid and 1,10-didecanedicarboxylic acid; and an aromatic dicarboxylic acid, such as terephthalic acid, isophthalic acid, orthophthalic acid and naphthalenedicarboxylic acid.

Among the polymers defined by the formula, especially preferable are polyesters represented by the following formula (II), such as polyesters produced from D-glucose and aliphatic dicarboxylic acids having 5 to 10 carbons and polyesters produced from compounds derived from D-glucose by substituting a hydroxyl group with an alkyl group, a hydroxyalkyl group and the like and aliphatic dicarboxylic acids having 5 to 10 carbons:

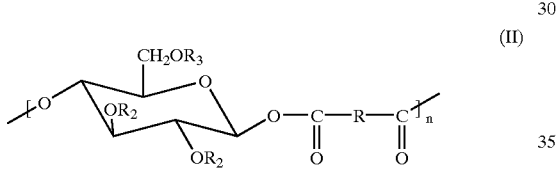

(II)

(Where R denotes an alkylene; R1, R2 and R3 separately denote hydrogen atom, an alkyl of 1 to 10 carbons, or a hydroxyalkyl.).

Especially, in the case of using D-glucose in the portion of the saccharide structure, D-glucose can be obtained by decomposition of cellulose. From a viewpoint of recycling of immensely consumed paper, that is remarkably significant. The decomposition of cellulose can be carried out by chemical decomposition, such as hydrolysis with an acid or a base or by biodegradation using microorganism, such as employing cellulase.

By combining a proper acid- or base-generating agent generating an acid or a base upon irradiation with an electromagnetic wave or charged particles with these decomposable resins, decomposition can be promoted. This decomposition cannot be achieved at a desired time solely by biodegradation. Conventionally, as an example of a material containing a polymer having acid-decomposable functional groups and an acid-generating agent, for example, Japanese Patent Application Laid-Open No. 9-179302 discloses a photoresist to be used for an electronic device fabrication. Further, Japanese Patent Application Laid-Open No. 10-171120 discloses the usage of a natural material as one component for such a resist material composition. However, the natural materials are not all biodegradable and the compositions that are biodegradable do not contain an acid-generating agent or a base-generating agent.

As the photolytically acid-generating agent (the agent generating an acid by light) to be preferably used in the present invention, available are well-known compounds such as sulfonium salts, which can be, for example, a triphenylsulfonium trifluoroemethylsulfonic acid salt represented by the formula (III), and iodonium salts, which can be, for example, diphenyliodonium hexafluoroantimonate represented by the formula (IV). These photolytically acid-generating agents may be used solely or in combination with a plurality of the acid-generating agents. An amount of a photolytically acid-generating agent may preferably be 0.1 to 20% by weight and especially preferably 1to 5% by weight in a decomposable resin.

(III)

(IV)

As a photolytically base-generating agent (the agent generating a base by light), well-known compounds are usable, such as compounds represented by the formula (V) or the formula (VI). These compounds are disclosed in, for example, H. Tachi, M. Tunooka, J. Photopolymer Science and Technology, 12(2), 313(1999); T. Nishikubo, A. Kameyama, Y. Toya, Polymer J. 29(5), 450(1997).

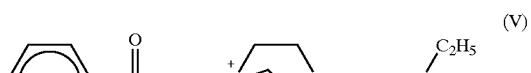
(V)

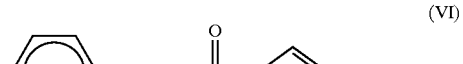
(VI)

Photolytically base-generating agents to be added may be used solely or in combination with a plurality of base-generating agents. An amount of a photolytically base-generating agent may preferably be 0.1 to 20% by weight and especially preferably 1to 5% by weight in a decomposable resin.

In the case where a decomposable resin composition of the present invention is required to be stable during use, a photolytically acid-generating agent or a photolytically base-generating agent to be used is required not to absorb visible light, but to absorb light, electromagnetic waves, or a charged particle beam irradiated thereto at the time when the decomposition treatment or discarding is carried out.

In the case where a decomposable resin composition containing such a photolytically acid-generating agent or a photolytically base-generating agent is to be subjected to the decomposition treatment or to be discarded, the resin composition is irradiated with electromagnetic waves or a charged particle beam. A light source to carry out the irradiation or an irradiation source may properly be selected corresponding to the absorption characteristics of the resin composition for the electromagnetic waves or a charged particle beam. For example, in the case of a decomposable resin composition with a relatively high light transmissivity, light with slightly shorter wavelengths than that of visible light are suitable. More practically, light in a range of 200 nm to 380 nm is employed. Further, if a decomposable resin composition, such as a colored resin, is extremely inferior in light transmissivity, electromagnetic waves such as X-rays and γ-rays with even shorter wavelengths may be employed. Further, an electron beam and an ion beam with a high accelerating voltage may be used. The irradiation dose of light and electromagnetic waves may preferably be 1 to 10,000 mJ/cm$^2$ or the irradiation dose of a charged particle beam may preferably be 1 to 1,000 μC/cm$^2$.

In the present invention, in the case where a compound generating an acid or a base upon exposure to heat is combined with a decomposable resin, for example, hydrochloric acid salts are usable. Also, as a compound generating a base upon exposure to heat, for example, silazane compounds are usable, such as octamethylcyclotetrasilazane, and ammonium salts, such as a carboxymethylcellulose ammonium salt. An amount of such a compound may preferably be 0.1 to 20% by weight and especially preferably 1 to 5% by weight in a decomposable resin. The heating temperature may preferably be 50 to 150° C. and the heating duration may preferably be 30 to 120 minutes.

In the treatment of a decomposable resin composition of the present invention, the decomposition speed of the resin can be controlled corresponding to the amount of an acid or a base to be generated by light irradiation or heating. The amount of an acid or a base that is generated can be controlled by controlling an amount of the acid-generating agent or the base-generating agent, the irradiation dose of the electromagnetic wave or the charge particle beam, or the heating conditions. Further, an acid-generating agent and a base-generating agent are made to coexist to control the concentration of the practically effective acid generated to subsequently control the decomposition speed.

Prior to being discarded, a used decomposable resin composition or an article molded from the composition in the present invention, light irradiation or a heat treatment is carried out to decompose it within a short time period in the environment.

A decomposable resin decomposed into monomers by a method according to the present invention may be recycled by synthesizing a decomposable resin again by recovering the monomers. That is, using a polymer produced from, for example, D-glucose and adipic acid, D-glucose and adipic acid obtained by the decomposition of an acid or a base generated from the acid-generating agent or the base-generating agent are again polymerized to synthesize the decomposable polymer. A decomposable resin composition is obtained by mixing an acid-generating agent and a base-generating agent by light irradiation or heating with such as resin. The obtained resin composition is used again in a general manner and made semi-permanently usable in a recycling system where the decomposition and recovery are carried out.

EXAMPLE 1

As a decomposable resin, a copolymer of D-glucose and adipic acid was prepared. A decomposable resin composition was produced by adding 5% by weight of a triphenylsulfonium trifluoromethylsulfonic acid salt as a photolytically acid-generating agent to the decomposable resin. The decomposable resin composition was injection molded at 120° C. to produce a 200 μm-thick sheet. After the sheet was used, it was irradiated with X-rays from an X-ray tube having a tungsten target (1,000 mJ/cm$^2$) to generate an acid and then a heat treatment was carried out at 110° C. for 90 minutes.

EXAMPLE 2

As a decomposable resin, a polylactic acid was prepared. A decomposable resin composition was produced by adding 7% by weight of a N-hydroxynaphthalimide trifluoromethylsulfonic acid salt as a photolytically acid-generating agent to the decomposable resin. The decomposable resin composition was injection molded at 180° C. to produce a sheet similar to that in Example 1. After the sheet was used, it was irradiated with light from a high pressure mercury lamp (10 Kw) for 20 minutes to generate an acid and then a heat treatment was carried out at 120° C. for 60 minutes.

EXAMPLE 3

As a decomposable resin, a polylactic acid-aliphatic polyester copolymer was prepared using hydroxybutanoic acid. A decomposable resin composition was produced by adding 10% by weight of the compound represented by the formula (IV) as a photolytically base-generating agent to the decomposable resin. The decomposable resin composition was injection-molded at 150° C. to produce a sheet similar to that in Example 1. After the sheet was used, it was irradiated with light from a high pressure mercury lamp in the same manner as in Example 2 to generate a base and then a heat treatment was carried out at 120° C.

EXAMPLE 4

As a decomposable resin, a polylactic acid-aliphatic polyester copolymer was prepared using hydroxpropionic acid. A decomposable resin composition was produced by adding 3% by weight of octamethylcyclotetrasilazane as a base-generating agent by heating to the decomposable resin. The decomposable resin composition was dissolved at a 10% concentration in propylene glycol monomethyl ether acetate, applied to and dried on a glass substrate and then peeled from the substrate to produce a sheet-like film. After the sheet was used, it was heated at 170° C. for 120 minutes to generate ammonia.

EXAMPLE 5

As a decomposable resin, a copolymer of D-glucose and adipic acid was prepared. A decomposable resin composition was produced by adding 10% by weight of a triphenylsulfonium trifluoromethylsulfonic acid salt as a photolytically acid-generating agent to the decomposable resin and further adding 4% by weight of the compound represented by the formula (IV) to the decomposable resin as a base-generating agent. The decomposable resin composition was injection-molded at 120° C. to produce a 200 μm-thick sheet. After the sheet was used, it was irradiated with X-rays from an X-ray tube having a tungsten target (2,000 mJ/cm²) to generate an acid and a base and then a heat treatment was carried out at 110 C. for 40 minutes.

EXAMPLE 6

Sheets of 200 μm thickness produced from the resin composition used in Example 1 were prepared. The sheets were exposed to X-rays from an X-ray tube having a tungsten target. The irradiation dose was changed to 10 mJ/cm², 100 mJ/cm², and 1,000 mJ/cm². After the resulting resin compositions were heated at 110° C. in the same manner as in Example 1, they were buried in the ground and the changes in them were observed after 3 months. As a result, the degree of decomposition increased depending on the irradiation dose of the X-ray.

EXAMPLE 7

Using the decomposable resin composition used in Example 1, a box of a printer was produced. As in Example 1, after use, X-ray irradiation and heat treatment were carried out to decompose the resin by a biodegradation reaction apparatus to recover D-glucose and adipic acid, which are raw materials of the resin. The resin used in Example 1 was again synthesized using these raw materials.

EXAMPLE 8

Sheets of 200 μm thickness produced from the decomposable resin composition used in Example 1 were prepared. In the same manner as in Example 5, X-ray irradiation was carried out followed by a heat treatment at 110° C. Then, the resulting sheets were buried together with saplings of trees in dry soil while encapsulating a plant fertilizer, a moisture retaining agent, and water. The sheets produced from the resin composition of the present invention slowly released the fertilizer and water to continuously support the growth of the trees and, at the same time, they decomposed in the environment and nothing after 6 months.

COMPARATIVE EXAMPLE

A sheet was produced solely from the respective polymers employed in Example 1 to Example 5 without adding an acid-generating agent or a base-generating agent. Also, for comparison, sheets of non-biodegradable polycarbonate and polyethylene were prepared. These sheets and the sheets produced in Example 1 to Example 4 were respectively buried in the ground and the sheets were recovered after 6 months and the degree of their decomposition was evaluated. As a result, sheets mixed with an acid-generating agent or a base-generating agent and subjected to electromagnetic wave irradiation were found to have a higher decomposition rate. The results are shown in Table 1. In Table 1, letter "A" denotes excellent decomposition; "B" denotes sufficient decomposition; "C" denotes no decomposed; and "-" stands for not performed.

TABLE 1

|  | Addition of acid-generating agent | Addition of base-generating agent | Addition of acid-generating agent and base-generating agent | No addition of generating agent |
|---|---|---|---|---|
| Polymer of D-glucose/adipic acid | A | — | A | B |
| Polylactic acid | — | A | A | C |
| Polylactic acid-aliphatic polyester copolymer | A | A | A | B |
| Polycarbonate | B | B | B | C |
| Polyethylene | C | C | C | C |

A decomposable resin composition of the present invention can be decomposed at a sufficiently increased decomposition speed in the environment and the decomposition of a resin can be controlled at an optional speed by controlling the amount of an acid or a base generated in the decomposable resin composition.

Further, the treatment method of the present invention accelerates the decomposition of a decomposable resin composition and makes it possible to decompose a resin composition after use to obtain the resin's monomers. Consequently, the monomers can be recovered and polymerized to obtain new raw decomposable resin materials, thus providing a recycling system.

Further, employing the discarding method according to the present invention, a used decomposable resin composition can be decomposed within a short time in the environment.

What is claimed is:

1. A method of producing a resin composition comprising the steps of:

providing a resin composition comprising an agent generating an acid by light and/or an agent generating a base by light in a hydrolyzable and biodegradable resin;

subjecting the resin composition to light irradiation and/or heat treatment to decompose the resin composition to monomers;

polymerizing the monomers to produce a decomposable resin; and mixing compounds generating an acid or a base by light irradiation or heating with the decomposable resin.

* * * * *

UNITED STATES PATENT AND TRADEMARK OFFICE
CERTIFICATE OF CORRECTION

PATENT NO. : 6,653,364 B2  Page 1 of 1
DATED : November 25, 2003
INVENTOR(S) : Hiroshi Maehara It is certified that error appears in the above-identified patent and that said Letters Patent is hereby corrected as shown below:

Column 3,
Line 39, "denote" should read -- denote a --.

Column 4,
Line 12, "1to" should read -- 1 to --.

Column 8,
Line 2, "sufficient" should read -- insufficient --; and
Line 3, "decomposed" should read -- decomposition --.

Signed and Sealed this

Eighth Day of June, 2004

JON W. DUDAS
*Acting Director of the United States Patent and Trademark Office*